(12) United States Patent
Hashimoto et al.

(10) Patent No.: US 6,736,286 B2
(45) Date of Patent: May 18, 2004

(54) TABLET FEEDER

(75) Inventors: Hiroshi Hashimoto, Toyonaka (JP);
Tasuku Minami, Toyonaka (JP);
Hiroyasu Hamada, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 58 days.

(21) Appl. No.: 10/217,645

(22) Filed: Aug. 14, 2002

(65) Prior Publication Data
US 2003/0038143 A1 Feb. 27, 2003

(30) Foreign Application Priority Data

Aug. 21, 2001 (JP) ........................................ 2001-250335

(51) Int. Cl.$^7$ ................................................ B65G 59/00
(52) U.S. Cl. ........................................ 221/266; 221/277
(58) Field of Search ................................ 221/266, 277, 221/258, 263, 265, 2, 7, 13, 82, 172; 111/77

(56) References Cited

U.S. PATENT DOCUMENTS 5,927,546 A * 7/1999 Yuyama et al. ............. 221/265
6,471,093 B1 * 10/2002 Kodama ...................... 221/266

FOREIGN PATENT DOCUMENTS

JP   63-50242   10/1988

\* cited by examiner

*Primary Examiner*—Kenneth W. Noland
(74) *Attorney, Agent, or Firm*—Wenderoth, Lind & Ponack, L.L.P.

(57) ABSTRACT

The present invention provides a tablet feeder in which a rotor can smoothly rotate to discharge tablets in spite of a large volume type of tablet containing case having a simple construction. A support portion 11 is provided in the tablets containing case 4 and positioned above at least one of the pocket portions 9 for preventing the weight of the tablets acting on the pocket portions 9 from resisting the rotation of the rotor 8.

11 Claims, 6 Drawing Sheets

(a)

(b)

TABLET FEEDER

BACKGROUND OF THE INVENTION

The present invention relates to a tablet feeder.

Conventionally, there has been provided a tablet feeder in which a rotor provided on a bottom of a tablet containing case is driven to rotate so that tablets contained in the tablet containing case are discharged. A tablet feeder having a plurality of tablet containing cases of different volumes according to size or usage of tablet is also known (See Japanese Patent Publication No. 63-50242).

In the tablet feeder, however, a heavy weight of the tablets contained in the tablet containing case of large volume may act on the rotor, preventing the rotor from smoothly rotating. Thus, as a motor for rotating the rotor, it is necessary to use a motor having a high driving force and high cost.

SUMMARY OF THE INVENTION

It is an object of the present invention to provide a tablet feeder in which a rotor can smoothly rotate to discharge tablets in spite of a large volume type of tablet containing case having a simple construction.

In order to accomplish the above object, according to the present invention, there is provided a tablet feeder comprising a case supporting base and a tablet containing case removably mounted on the case supporting base, wherein a motor provided in the case supporting base is driven to rotate a rotor provided in the tablet containing case so that the tablets contained in the tablet containing case are held in pocket portions of the rotor and moved to a discharge passage provided in the case supporting base, whereby the tablets are discharged through the discharge passage, the tablets feeder comprising: a support portion provided in the tablets containing case and positioned above at least one of the pocket portions for preventing the weight of the tablets acting on the pocket portions from resisting the rotation of the rotor.

According to the construction above, even if the tablet containing case has a large volume and is in a condition that a large number of tablets are contained, as the weight of the tablets above the support portion do not act on the rotor, the rotation of the rotor can not be prevent.

It is preferable in that the tablets can be smoothly discharged for the support portion to have a residence preventing shape for preventing residence of the tablets on the support portion and allowing the tablets to be smoothly held in the pocket portion of the rotor.

In a preferred embodiment, the support portion may be formed between opposite side walls of the tablet containing case. In this case, the support portion may comprise two or more segments.

Alternatively, the support portion may be supported by leg portions extended from the bottom wall or the side walls of the tablet containing case. In this case, the support portion may have a doughnut shape. The support portion may also have a frust-conical shape. On the upper surface of the frust-conical shape of the support portion may be formed a brush portion. In addition, the support portion may be extended from one side wall of the tablet containing case to a portion above the discharge passage.

Preferably, the residence preventing shape may be a domed shape or an inclined shape.

BRIEF DESCRIPTION OF THE DRAWINGS

Other objects and features of the present invention will become clear from the following detail description with reference to the accompanying drawings in which.

DETAILED DESCRIPTION OF THE PREFERRED EMBODIMENTS

Figure 1:
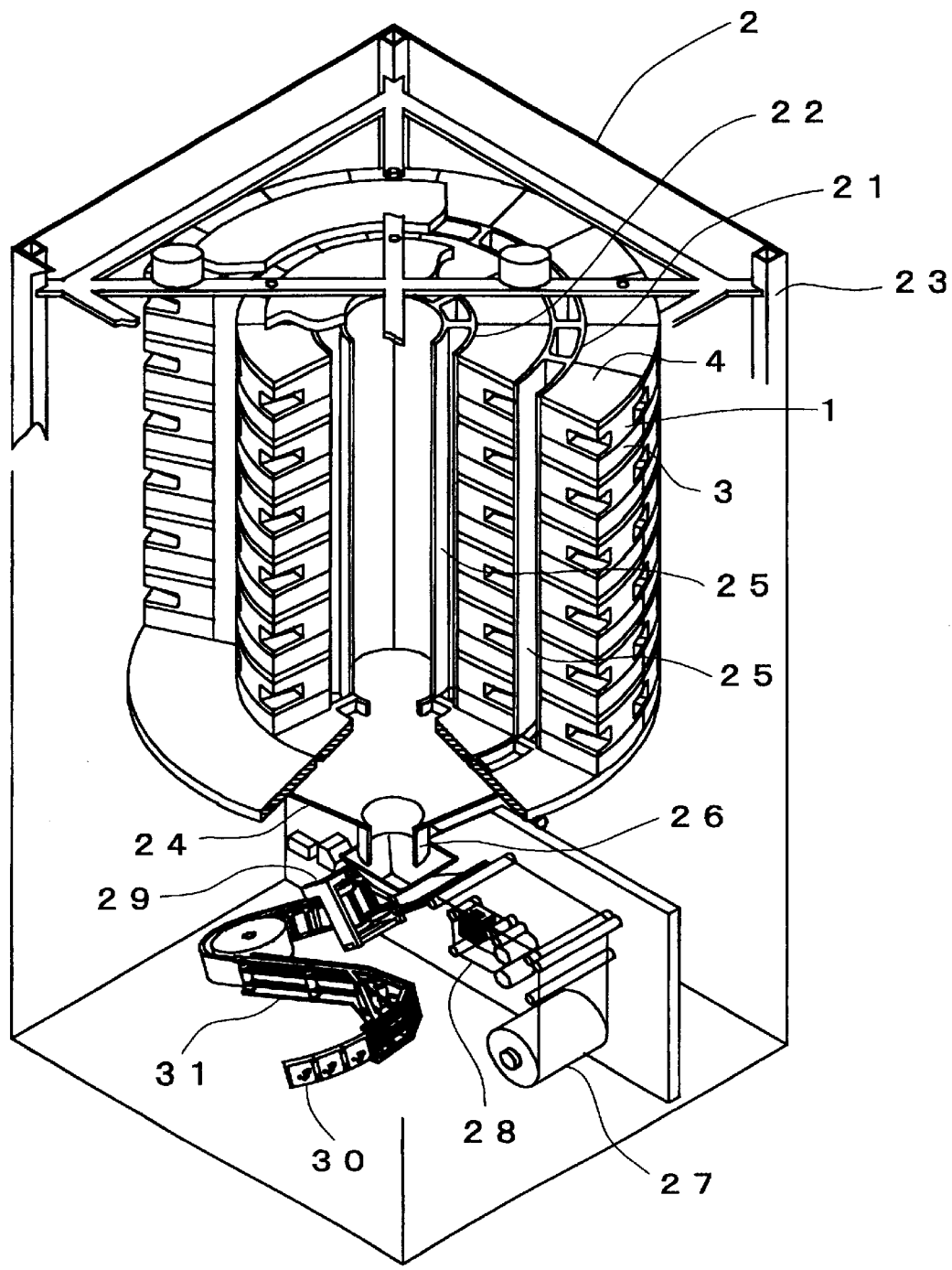
FIG. 1 is a perspective view of a tablet feed apparatus provided with a plurality of tablet feeders according to the present invention.

FIG. 1 shows a tablet feed apparatus 2 having a plurality of tablet feeders 1. The tablet feed apparatus 2 has an outer and inner drums 21 and 22 which are rotatably disposed in a casing 23 and on the outside surface of which the plurality of tablet feeders 1 are provided. The tablets discharged form each of the plurality of tablet feeders 1 fall into a collecting hopper 24 disposed beneath the outer and inner drums 21 and 22 through guide passages 25 formed on the inside surfaces of the outer and inner drums 21 and 22. The tablets which pass through the collecting hopper 24 are introduced through a packing hopper 26 into bag portions which is continuously formed from a rolled sheet 27 and on which a necessary information such as medicine taking time is printed by a printer 28. The bag portions are sealed by a pair of heat rollers 29 to become a medicine packed belt 30. The medicine packed belt 30 is conveyed by a conveyor 31 to a discharge port formed on the front face of the casing 23.

The tablet feeder 1 comprises a case supporting base 3 fixed on the outside surface of the outer and inner drums 21 and 22 and a tablet containing case 4 removably mounted on the case supporting base 3.

Inside the case supporting base 3 is housed a motor (not shown) which is drive controlled based on a control signal from a control unit (not shown).

Figure 2:
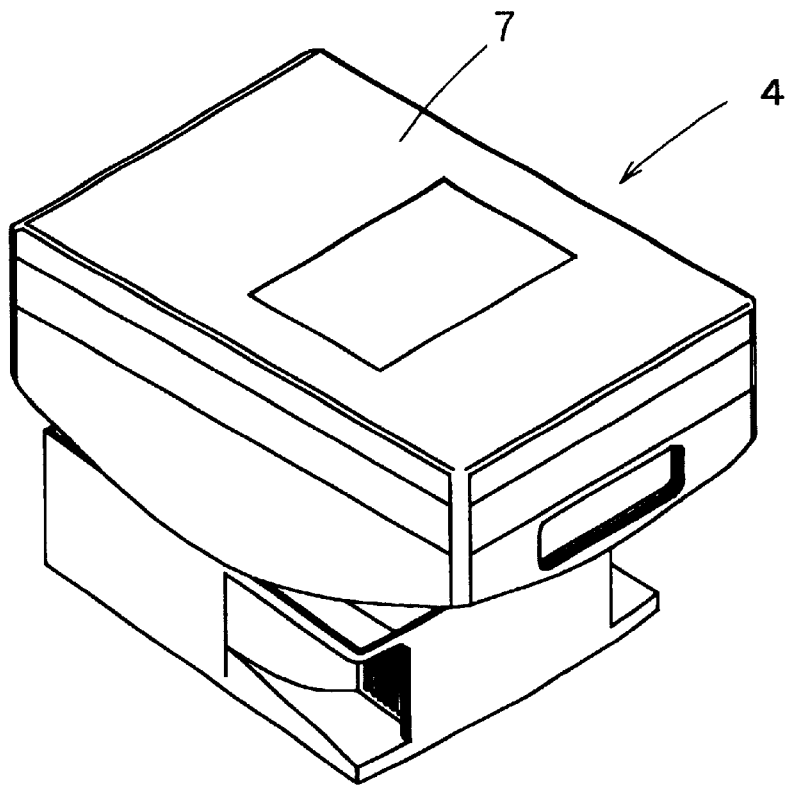
FIG. 2 is a perspective view of the tablet feeder of FIG. 1.
Figure 3:
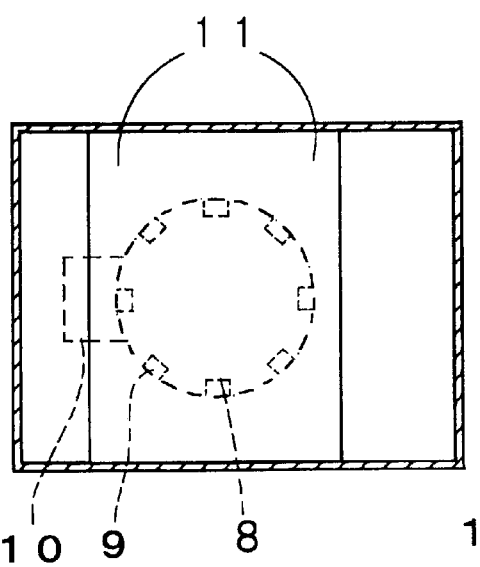
FIG. 3(a) is a horizontal sectional view of the tablet containing case with a support portion according to a first embodiment of the present invention and FIG. 3(b) is a vertical sectional view thereof.
Figure 3:
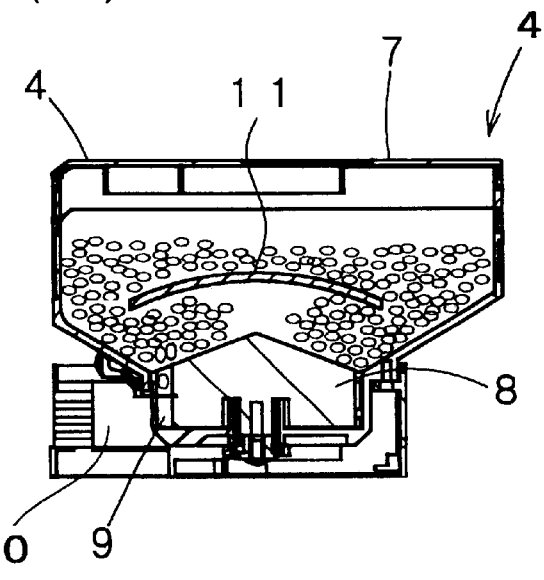

The tablet containing case 4, as shown in FIGS. 2 and 3, has a box-like shape and is provided with a lid 7 which is possible to open and close an upper open end of the case. The upper surface of the bottom wall of the tablet containing case 4 has a substantially conical shape. A rotor 8 is rotatably disposed on the bottom wall. The rotor has an upper conical portion and a lower cylindrical portion. On the outer surface of the cylindrical portion are formed a plurality of pocket portions 9 each of which has a channel shape extending in an axial direction and which are disposed at an equal angle. The pocket portion 9 has a width and a depth enabling to hold only one tablet. To a shaft of the rotor 8, a power of the motor provided in the case supporting base 3 is transmitted through a gears (not shown) so that the rotor 8 can rotate. The pocket portions 9 move in a circumferential direction as the rotor 8 rotates and communicate with a discharge passage 10 formed in the bottom of the tablet containing case 4 so that the tablet held by each of the pocket portions 9 can be discharged through the discharge passage 10.

Inside the tablet containing case 4, a support portion 11 is formed between opposite side walls. The support portion 11 has an upwardly convexed substantially arc shape (a residence preventing shape according to the present invention) of cross section. The support portion 11 is formed so as to cross an upper space above the rotor 8 and to support the tablets positioned above the support portion 8. Therefore, the rotor 8 is affected only by the weight of the tablets positioned between support portion 11 and the rotor 8. Thus, the rotor 8 can be smoothly rotated without using a motor of so large driving force. In addition, since the support portion 11 has the residence preventing shape described above, the tablets above the support portion 11 may not remain on the upper surface of the support portion 11 even if the tablets positioned between support portion 11 and the rotor 8 are discharged.

Alternatively, the support portion 11 formed in the tablet containing case 4 may be formed as shown in FIGS. 4 to 15.

Figure 4:
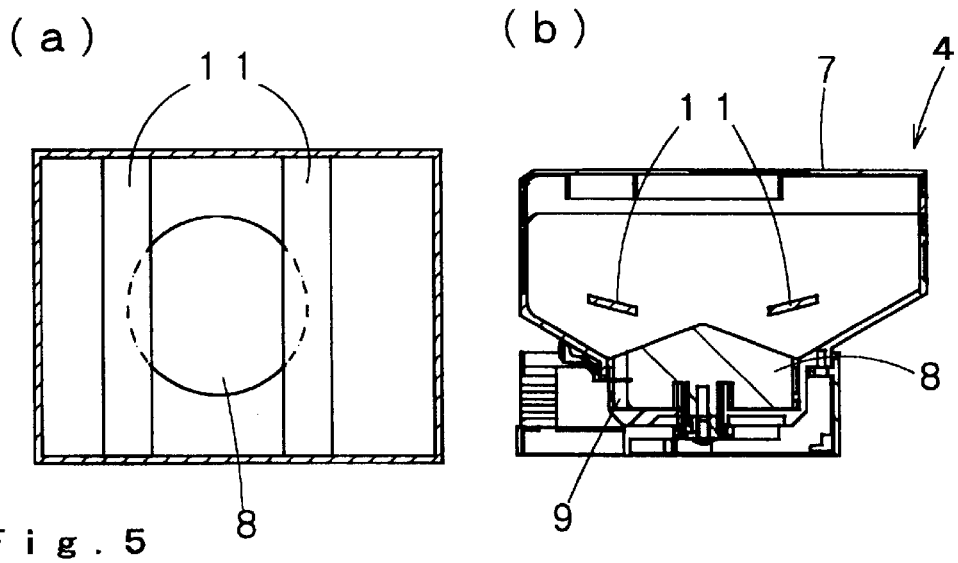
FIG. 4(a) is a horizontal sectional view of the tablet containing case with a support portion according to a second embodiment of the present invention and FIG. 4(b) is a vertical sectional view thereof.
Figure 5:
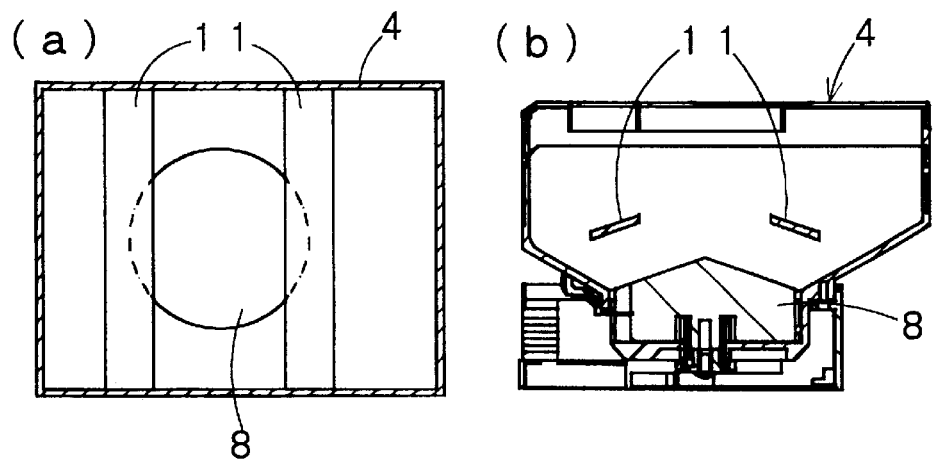
FIG. 5(a) is a horizontal sectional view of the tablet containing case with a support portion according to a third embodiment of the present invention and FIG. 5(b) is a vertical sectional view thereof.
Figure 6:
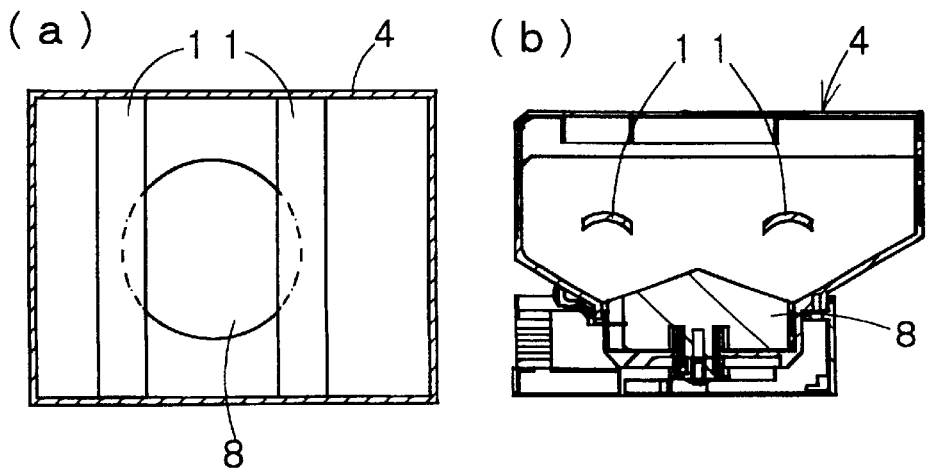
FIG. 6(a) is a horizontal sectional view of the tablet containing case with a support portion according to a fourth embodiment of the present invention and FIG. 6(b) is a vertical sectional view thereof.
Figure 7:
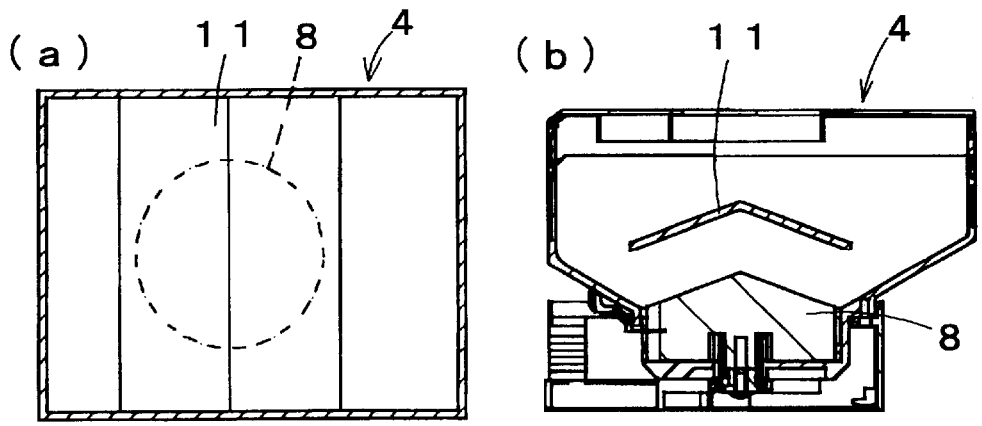
FIG. 7(a) is a horizontal sectional view of the tablet containing case with a support portion according to a fifth embodiment of the present invention and FIG. 7(b) is a vertical sectional view thereof.
Figure 8:
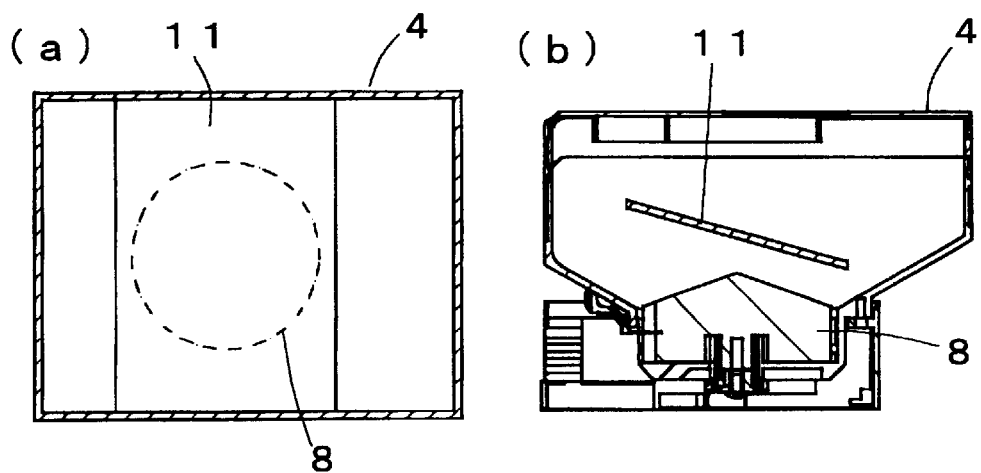
FIG. 8(a) is a horizontal sectional view of the tablet containing case with a support portion according to a sixth embodiment of the present invention and FIG. 8(b) is a vertical sectional view thereof.
Figure 9:
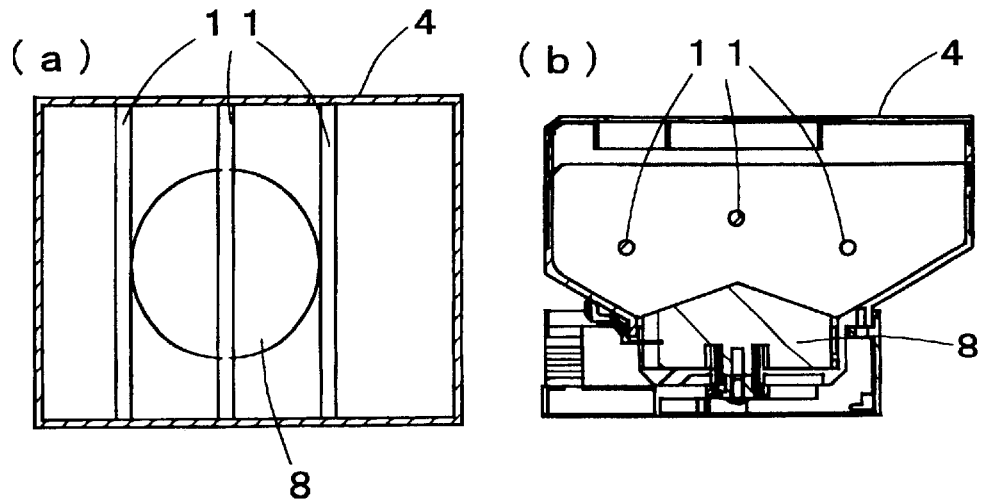
FIG. 9(a) is a horizontal sectional view of the tablet containing case with a support portion according to a seventh embodiment of the present invention and FIG. 9(b) is a vertical sectional view thereof.

In FIGS. 4 to 9, the support portion 11 is formed between opposite side walls similar to the embodiment described above. These arrangements allow the case 4 to be easily fabricated and to have a desired strength. In FIGS. 4 to 6, the support portion 11 comprises two segments. In FIG. 4, the support portion 11 has a residence preventing shape by forming the segments thereof in a downwardly inclined shape toward the center of the rotor 8, in FIG. 5 in an upwardly inclined shape toward the center of the rotor 8, and in FIG. 6 in an upwardly convexed arc shape. In addition, in FIG. 7, the support portion 11 has a residence preventing shape by forming it in an angled shape and in FIG. 8 in an inclined shape. In FIG. 9, the support portion 11 comprises three segments and have a residence preventing shape by forming it round bars.

Figure 10:
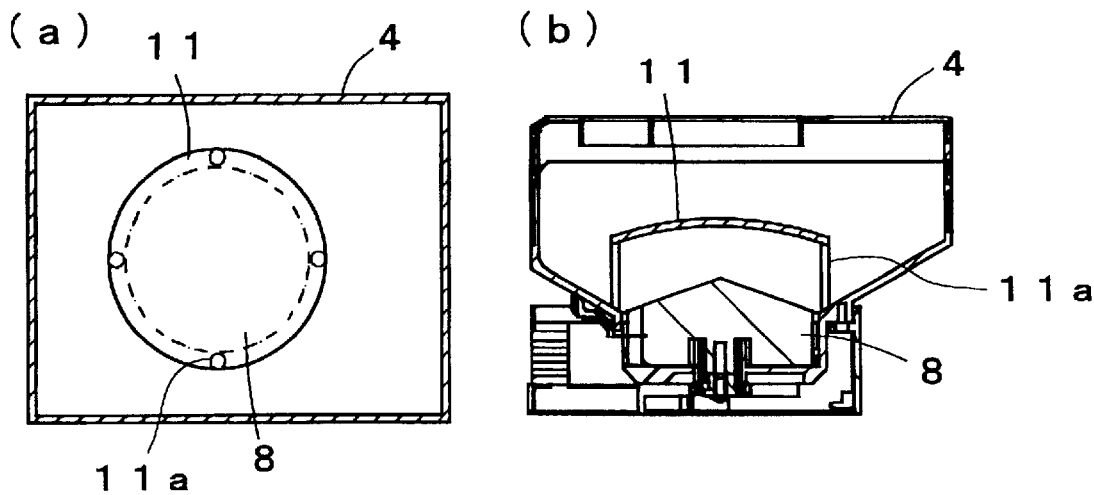
FIG. 10(a) is a horizontal sectional view of the tablet containing case with a support portion according to an eighth embodiment of the present invention and FIG. 10(b) is a vertical sectional view thereof.
Figure 11:
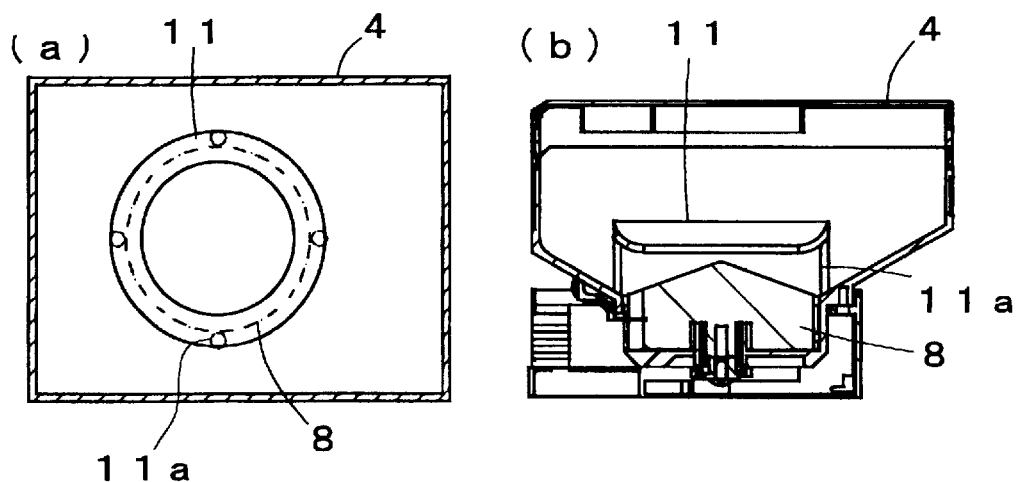
FIG. 11(a) is a horizontal sectional view of the tablet containing case with a support portion according to a ninth embodiment of the present invention and FIG. 11(b) is a vertical sectional view thereof.
Figure 12:
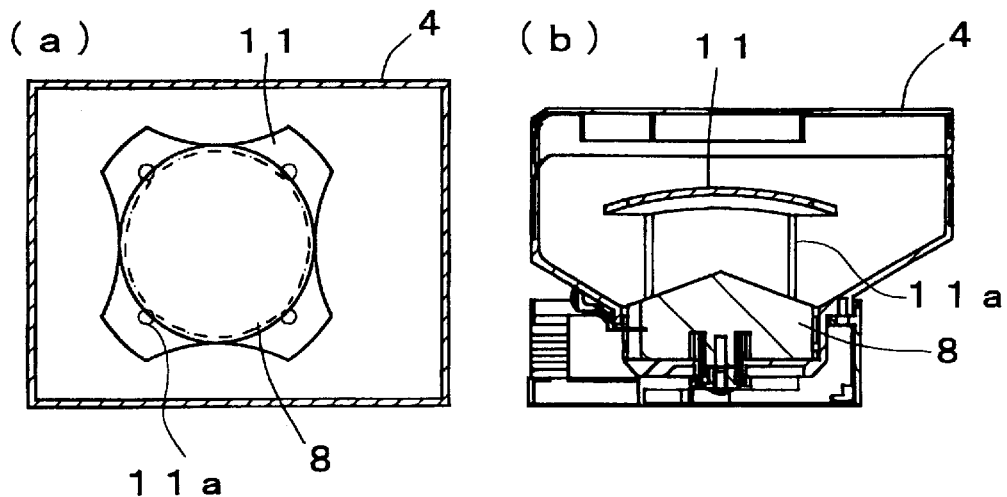
FIG. 12(a) is a horizontal sectional view of the tablet containing case with a support portion according to a tenth embodiment of the present invention and FIG. 12(b) is a vertical sectional view thereof.
Figure 13:
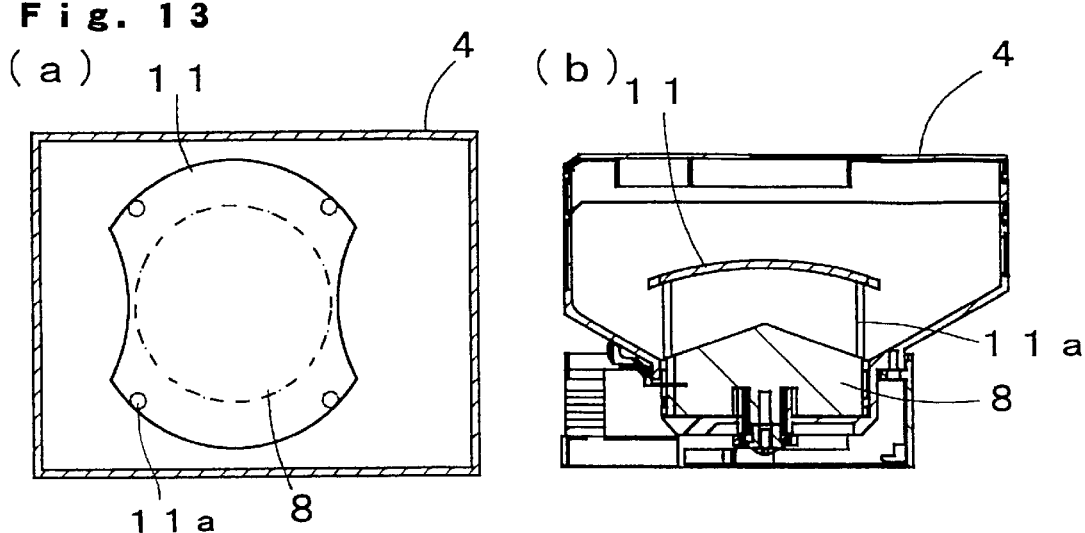
FIG. 13(a) is a horizontal sectional view of the tablet containing case with a support portion according to an eleventh embodiment of the present invention and FIG. 13(b) is a vertical sectional view thereof.
Figure 14:
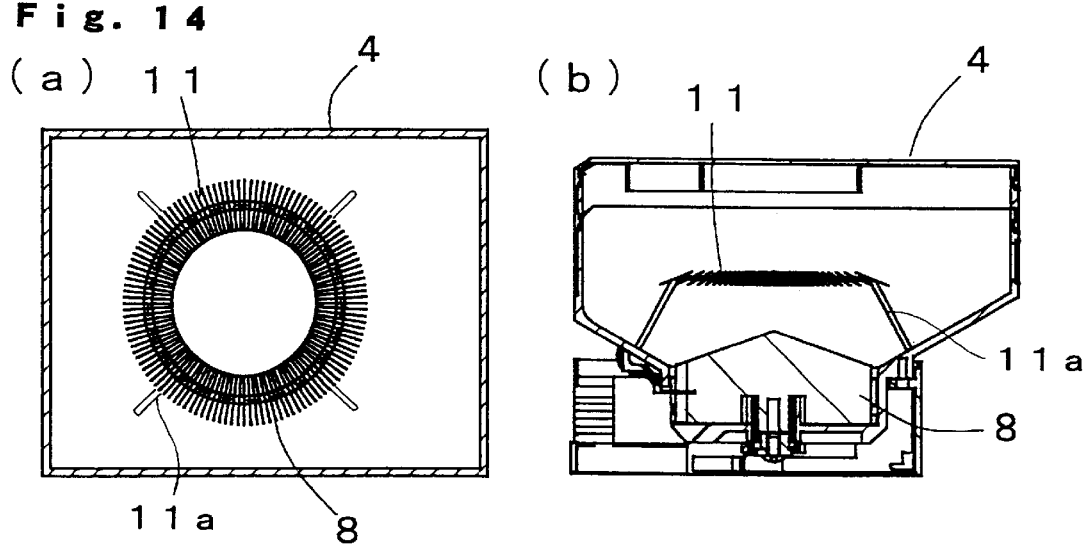
FIG. 14(a) is a horizontal sectional view of the tablet containing case with a support portion according to a twelfth embodiment of the present invention and FIG. 14(b) is a vertical sectional view thereof.

In FIGS. 10 to 14, the support portion 11 has a substantially circular disc shape which is supported by leg portions 11a extended from the bottom wall or the side walls. In FIG. 10, the support portion 11 has a residence preventing shape by forming it in a domed shape, in FIG. 11 in a doughnut shape the upper surface of which is downwardly inclined toward the center, in FIG. 12 in a domed star shape, in FIG. 13 in a domed shape the opposite peripheral edges of which are cut in an arc shape, and in FIG. 14 in a frust-conical shape on which a brush portion is formed. The support portion 11 with the brush portion in FIG. 14 is preferable in that the tablets are not damaged.

Figure 15:
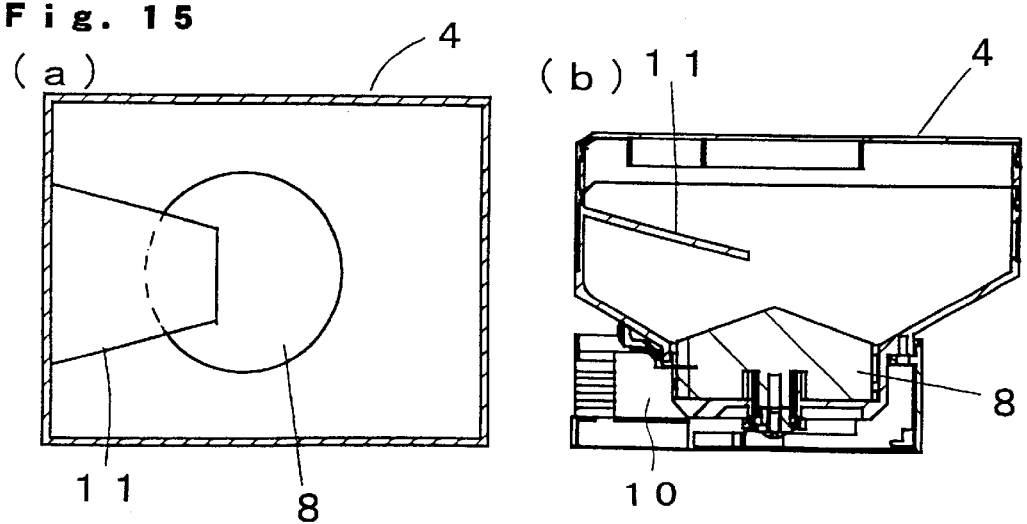
FIG. 15(a) is a horizontal sectional view of the tablet containing case with a support portion according to a thirteenth embodiment of the present invention and FIG. 15(b) is a vertical sectional view thereof.

In FIG. 15, the support portion 11 has a plate shape formed to the subminimal extent extending from one side wall to a portion above the discharge passage 10. The support portion 11 has a residence preventing shape by forming it in a downwardly inclined shape toward the center of the rotor 8.

In the embodiments described above, the support portion 11 is fixed on the tablet containing case 4 but may be removably attached to the case 4. That is to say, no restriction is imposed on the structure for disposing the support portion 11 unless the support portion 11 loses its function because the support portion 11 is turned over or lifted up when the tablets are moved by the rotation of the rotor 8. The shape of the support portion 11 is not limited to the above described embodiments if it can prevent the weight of the tablets from directly acting on the rotor 8 when a large number of tablets are contained in the tablet containing case 4. Furthermore, the residence preventing shape of the present invention is not limited to the arc, inclined, domed shape and so on, but includes various kinds of shapes that can smoothly move the tablets to the pocket portions 9 of the rotor 8 even if the tablets are capsules, elongated tablets, or naked tablets of calcium type medicine having a bad sliding property.

The support portion 11 of the present invention is effective with respective to the case which is possible to contain a large number of tables in a tablet feeder having a construction, for example, as shown in FIGS. 4(*b*) and (*c*) of Japanese Patent Publication No. 63-50242.

As clear from the above described explanation, according to the present invention, as the support portion is provided in the tablet containing case, even if the a large number of tablets are contained in the case, the rotation of the rotor is not prevented, enabling for the tablets to be smoothly discharged.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. A tablet feeder comprising:

a case supporting base;

a tablet containing case removably mounted on the case supporting base;

a rotor provided in the tablet containing case, the rotor being rotatable by a motor and having pocket portions so that the tablets contained in the tablet containing case can be held in the pocket portions of the rotor and moved to a discharge passage provided in the case supporting base, whereby the tablets are discharged through the discharge passage; and a support portion provided in the tablet containing case and positioned above at least one of the pocket portions for preventing the weight of the tablets acting on the pocket portions from resisting rotation of the rotor.

2. The tablet feeder as in claim 1, wherein the support portion has a residence preventing shape for preventing residence of the tablets on the support portion and allowing the tablets to be smoothly held in the pocket portion of the rotor.

3. The tablet feeder as in claim 1, wherein the support portion is formed between opposite side walls of the tablet containing case.

4. The tablet feeder as in claim 3, wherein the support portion comprises two or more segments.

5. The tablet feeder as in claim 1, wherein the support portion is supported by leg portions extended from the bottom wall or the side walls of the tablet containing case.

6. The tablet feeder as in claim 5, wherein the support portion has a doughnut shape.

7. The tablet feeder as in claim 1, wherein the support portion has a frusto-conical shape.

8. The tablet feeder as in claim 7, wherein on the upper surface of the frusto-conical shape of the support portion is formed a brush portion.

9. The tablet feeder as in claim 1, wherein the support portion is extended from one side wall of the tablet containing case to a portion above the discharge passage.

10. The tablet feeder as in claim 2, wherein the residence preventing shape is a domed shape.

11. The tablet feeder as in claim 2, wherein the residence preventing shape is an inclined shape.

* * * * *